United States Patent
Schulz et al.

(10) Patent No.: US 6,854,355 B2
(45) Date of Patent: Feb. 15, 2005

(54) LOCKING SYSTEM FOR AN ADJUSTABLE STEERING COLUMN

(75) Inventors: Achim Schulz, Niefern-Oeschelbronn (DE); Alexander Praetorius, Ditzingen-Heimerdingen (DE); Michael Klandt, Remseck (DE)

(73) Assignee: Dr. Ing. h.c.F. Porsche AG, Weissach (DE)

( * ) Notice: Subject to any disclaimer, the term of this patent is extended or adjusted under 35 U.S.C. 154(b) by 210 days.

(21) Appl. No.: 10/164,695

(22) Filed: Jun. 10, 2002

(65) Prior Publication Data

US 2003/0005787 A1 Jan. 9, 2003

(30) Foreign Application Priority Data

Jun. 11, 2001 (DE) .......................................... 101 29 165

(51) Int. Cl.[7] .................................................. B62D 1/18
(52) U.S. Cl. ........................................ 74/493; 280/775
(58) Field of Search .................... 74/492, 493; 280/775, 280/777

(56) References Cited

U.S. PATENT DOCUMENTS

| 4,472,982 | A | 9/1984 | Nishikawa .................... 74/493 |
| 4,541,298 | A | 9/1985 | Strutt ........................... 74/493 |
| 4,732,050 | A | 3/1988 | Vollmer ........................ 74/493 |
| 4,752,085 | A | 6/1988 | Yamamoto ................... 280/775 |
| 5,275,066 | A | 1/1994 | Hancock ....................... 74/493 |
| 5,477,744 | A | 12/1995 | Hoblingre et al. ............. 74/493 |
| 6,279,951 | B1 * | 8/2001 | Cartwright et al. ......... 280/775 |
| 6,543,807 | B2 * | 4/2003 | Fujiu et al. ................. 280/775 |
| 2002/0066334 | A1 * | 6/2002 | Kim et al. ..................... 74/493 |
| 2003/0094062 | A1 * | 5/2003 | Lee .............................. 74/493 |

FOREIGN PATENT DOCUMENTS

| DE | 36 19 125 | 10/1987 |
| DE | 44 13 798 | 9/1995 |
| DE | 693 03 138 | 10/1996 |
| EP | 0 440 403 | 8/1991 |
| EP | 0 673 825 | 9/1995 |
| EP | 1070651 | 1/2001 |

* cited by examiner

Primary Examiner—David M. Fenstermacher
(74) Attorney, Agent, or Firm—Crowell & Moring LLP

(57) ABSTRACT

A locking system for an adjustable steering column has an adjusting device for adjusting the steering column in the vertical direction, and a locking device for the form-fitting locking of the steering column in the vertical direction, particularly for motor vehicles. In order to provide an adjustable steering column which is improved with respect to the required installation space, it is suggested that the adjusting device comprises a vehicle-body-fixed swivel bearing for the steering column and a control arm swivellably held at a distance thereto on the vehicle body. In this case, the control arm is disposed on the steering column in a sliding seat.

27 Claims, 6 Drawing Sheets

26

LOCKING SYSTEM FOR AN ADJUSTABLE STEERING COLUMN

BACKGROUND AND SUMMARY OF THE INVENTION

This application claims the priority of patent application no. 101 29 165.5, filed in Germany on Jun. 11, 2001, the disclosure of which is expressly incorporated by reference herein.

The invention relates to a locking system for an adjustable steering column having an adjusting device for adjusting the steering column in the vertical direction and having a locking device for the form-fitting locking of the steering column in the vertical direction, particularly for motor vehicles.

From European Patent Document EP 0 440 403 B1 (corresponds to U.S. Pat. No. 5,161,425) an adjustable steering column mechanism has become known, in which case, for adjusting a vertical position, a toothing is provided which is fixedly arranged on the vehicle body side and into which a tooth segment engages which is connected with the steering column. The tooth segment is prestressed by way of a swivellable eccentric.

U.S. Pat. No. 4,472,982 shows a swivelling device for a steering column. A console for the steering column is held swivellably about an axis fixedly arranged on the vehicle body. For fixing the adjusted position, a tooth segment extending radially with respect to the swivelling axis is provided on the vehicle-body-side receiving device. A counterpart connected with the console engages in this tooth segment.

From U.S. Pat. No. 4,541,298, it is known to provide toothed racks on a console for receiving a steering column. Gear wheels engage with the toothed racks; on the receiving device held on the vehicle body side, second toothed racks and respective corresponding gear wheels are situated. The pairs of gear wheels can be fixed with respect to one another by way of face-side toothings as soon as the gear wheels are braced with respect to one another by way of a tensioning axis.

German Patent Document DE 36 19 125 C1 (corresponds to U.S. Pat. No. 4,732,050) discloses an adjustable steering column of a motor vehicle, in the case of which pairs of tooth segments are arranged on both sides of the steering column. The pairs of tooth segments are perpendicularly arranged with respect to one another and can be fixed by means of a common tensioning device.

With respect to this state of the art, it is an object of the invention to provide a locking system for an adjustable steering column which is improved with respect to the required installation space.

According to the invention, this object is achieved by providing an adjustable steering column having a first adjusting device for adjusting the steering column in a vertical direction and a first locking device for form-fitting locking of the steering column in the vertical direction, wherein the first adjusting device comprises a vehicle-body-fixed swivel bearing for the steering column and a control arm which is swivellably held at a distance from the swivel bearing on the vehicle body, said control arm being disposed at the steering column in a sliding seat. According to certain preferred embodiments of the invention, it is suggested that the adjusting device includes a vehicle-body-fixed swivel bearing for the steering column and a control arm swivellably held at a distance thereto on the vehicle body. In this case, the control arm is disposed in a sliding seat on the steering column. As a result of this arrangement, the steering column according to the invention takes up very little space, because, depending on the arrangement of the sliding seat, the adjusting device does not project at all or projects only a little in its width beyond the steering column. As a result of the arrangement of the sliding seat below the steering column, installation space laterally to the steering column is required only for guiding the control arms past the steering column.

Advantageous further developments are described in the herein and in the claims.

It is suggested according to certain preferred embodiments of the invention to provide a console which accommodates the swivel bearing and the control arm. As a result of this measure, a steering column unit is formed which is closed in itself and which can be preassembled as a whole. Since all movable elements, that is, the swivel bearing and the control arm, are accommodated in the console, no additional adjustment will be required. This steering column unit, which is closed in itself, is also advantageous with respect to vibrations. The steering column unit need not be directly fastened to the vehicle body but can also be held on a cross member or on a bearing unit for the foot controls.

Furthermore, it is suggested according to certain preferred embodiments of the invention to construct the control arms as a box-type rocker device in order to increase the stiffness of the arrangement.

In addition, it is suggested according to certain preferred embodiments of the invention to cause the locking device to be applied to the sliding seat. As a result of this measure, the constructional expenditures as well as the required space are minimized. The sliding seat is as a rule arranged centrally on or under the steering column, so that a locking system which is effective here is arranged on or under the steering column but not laterally on the steering column. In addition, only a single locking system will be required.

It is suggested according to certain preferred embodiments of the invention to provide another adjusting device with an assigned locking device which are operative in the longitudinal direction of the steering column. In the case of this arrangement, a common operating device can advantageously be provided for both locking devices. Beyond the reduction of the constructional expenditures, this improves the operating reliability when adjusting the steering column because, as a result of the operation of the single operating device, the driver can completely unlock or lock the steering column.

In each case, the locking devices according to certain preferred embodiments of the invention comprises a corresponding pressure piece with a face-side toothing and a spring-loaded cone. The spring-loaded cone is guided parallel with respect to the tooth segment; the pressure piece is guided perpendicularly thereto. In the inoperative condition, the spring pushes the cone onto the pressure piece so that the face-side toothing of the pressure piece is pressed into the tooth segment. This locking device is locked in the inoperative condition and is unlocked by a displacement of the conical piece against the force of the spring. The use of a cone is advantageous because of the line contact between the cone and the pressure piece; however, in principle, other, particularly wedge-shaped elements can also be used instead of the cone. When, viewed in the direction of the force of gravity, the pressure piece is arranged below the tooth segment, a simplified unlocking of the locking device is achieved because the force of gravity will disengage the pressure piece when the cone is pushed back. The tooth segment can be worked directly into the component to be secured. For the adjustment in the longitudinal direction, the tooth segment can, for example, be worked as a toothing on the exterior side into a jacket tube, the jacket tube being longitudinally displaceably guided in the steering shield tube. The pressure piece is then guided in a slot which is arranged on the steering shield tube. Such an arrangement is known, for example, from German Patent Document DE 44 13 798 A1.

When the cones are arranged so that their tapered end is arranged in the driving direction, there is also the advantage that, in the event of a frontal collision, the locking devices are additionally loaded in the locking direction as a result of the occurring accelerations, so that the locking effect is intensified and a displacement of the steering column by an opening of the locking device can be reliability prevented.

In the case of the locking device operating in the vertical direction, the tooth segment can, for example, be connected by way of an arm with a movable part of the sliding seat according to certain preferred embodiments of the invention. The tooth segment is then preferably also guided on the steering shield tube, and a slot receiving the pressure segment is arranged in the area of this guidance on the steering shield tube. In the case of such an arrangement, it is particularly easily possible to advantageously arrange the two locking devices in a locally adjacent manner. Such an arrangement has the advantage that the common operation of the locking devices can be achieved at low constructional expenditures.

Finally, it is an advantage for the two locking devices to be constructed such that largely identical constructional elements can be used according to certain preferred embodiments of the invention. Thus, for example, the pressure pieces and the cones can be constructed as identical parts.

The two locking devices can be arranged in an aligned manner according to certain preferred embodiments of the invention. In this case, the machining expenditures will be reduced because the required bores can be produced in a single setting. The casting tool for the housing can also have a simpler design and slides of the casting tool can be combined.

The two locking devices may be arranged to be equally acting or oppositely acting according to certain preferred embodiments of the invention. In the case of an equally acting arrangement, the joint operating device should be provided at the end of the two locking devices situated behind one another. In the case of oppositely acting locking devices, the joint operating device should be arranged between the locking devices.

The two locking devices may be operated simultaneously or successively according to certain preferred embodiments of the invention. When they are operated simultaneously, an activating of the operating device will open both locking devices, and the steering column can be freely moved in the vertical and longitudinal direction. When the operation takes place successively, an intermediate position of the operating device may be provided, in which the steering column can be adjusted, for example, only in the vertical direction. Only when the operating device has reached its end position as a result of a second activating, will the steering column be freely movable in the vertical and longitudinal direction.

An electric geared motor or a manual operating device can be provided as an operating device for the two locking devices according to certain preferred embodiments of the invention. The manual operating device preferably comprises a handle which is rotatably disposed and, for generating a longitudinal movement, is held on a spiral-shaped ramp. A pull rod connected with the handle penetrates the spring-loaded cones and transmits the longitudinal movement of the handle to the cones.

The use of the adjustable steering column according to the invention is preferably provided for motor vehicles, but is not limited thereto.

Other objects, advantages and novel features of the present invention will become apparent from the following detailed description of the invention when considered in conjunction with the accompanying drawings.

DETAILED DESCRIPTION OF THE DRAWINGS

Figures 1, 2:
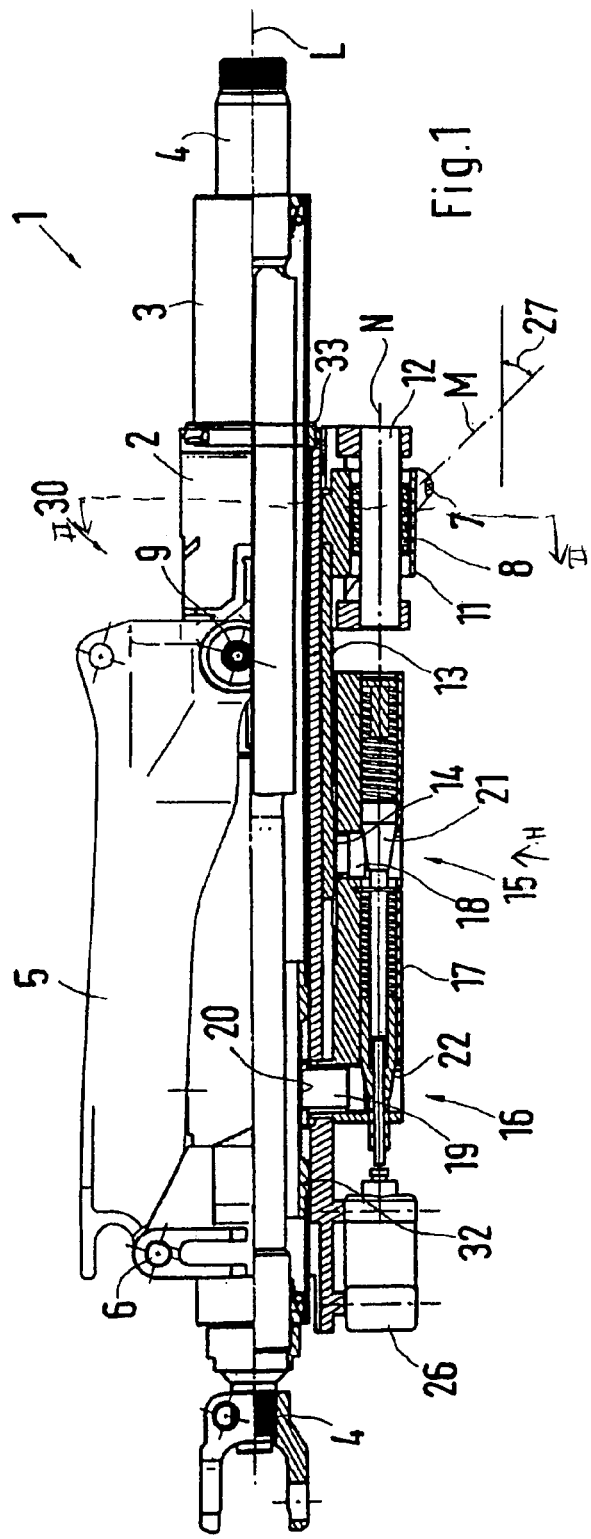
FIG. 1 is a lateral part-sectional view of an adjustable steering column constructed according to certain preferred embodiments of the invention.
FIG. 2 is a sectional view taken along plane II-II of FIG. 1.

FIG. 1 is a lateral view of an adjustable steering column 1. The steering column 1 comprises a steering shield tube 2, a jacket tube 3 and a steering shaft 4. The steering shield tube 2 is held on a console 5 which, in turn, is fastened to a body of the vehicle by way of a support for foot controls of this vehicle which is not shown. The jacket tube 3 is longitudinally displaceably in the direction of the steering axis L held in the steering shield tube 2 by means of a first adjusting device 31 comprising bearings 32 and 33. The steering shaft 4 is rotatably disposed inside the jacket tube 3.

The steering shield tube 2 is connected with the console 5 by way of a second adjusting device 30 which includes a swivel bearing 6 and one or several control arms 7 which are held in a sliding seat 8 on the steering shield tube 2. In the present embodiment, the control arms 7 are constructed, for example, as a box-type rocker which, at its first end 9 is swivellably connected with the console and, at its second bearing end 10, is swivellably connected with the sliding seat 8. The box-type rocker 7 is arranged such that, in no position of the swivelling movement of the steering shield tube 2 relative to the console, will its center axis M come to be situated perpendicular to a center axis N of the sliding seat 8, because otherwise the swivel movement of the steering shield tube 2 would be blocked. In the illustrated example, an angle 27 of a size of 45° is provided in the upper starting position of the steering shield tube 2 between the center axis M of the box-type rocker 7 and the center axis N of the sliding seat 8.

The sliding seat 8 includes a sliding piece 11 rotatably connected with box-type rocker 7, which sliding piece 11 is guided on a bolt 12 parallel to the steering axis L on the steering shield tube 2. An arm 13, which carries a tooth segment 14 on its end facing away from the sliding piece 11, is connected with the sliding piece 11. A housing 17 fastened to the steering shield tube 2 receives two locking devices 15, 16. In this case, the first locking device 15 acts in the vertical direction H; that is, upon a swivelling of the steering shield tube 2 relative to the console 5. The second locking device 16 blocks a displacement of the jacket tube 3 in the direction of the steering axis L relative to the steering shield tube 2. In the housing 17, two pressure segments 18, 19 are guided which are each provided with a face-side toothing. The first pressure segment 18 interacts with the tooth segment 14. The second pressure segment 19 interacts with a toothing 20 which is worked on the exterior side into the jacket tube 3 in the area of the pressure segment.

The pressure segments 18, 19 are moved by cones 21, 22 which are held by springs 23, 24 in their illustrated inoperative position. In this inoperative position, the locking devices 15, 16 are in their locked condition.

A coupling rod 25 fastened on the cone 21 penetrates the second cone 22 as well as a cylindrical extension 28 provided on the second cone 22. The coupling rod 25 and the cylindrical extension 28 can be cut to their length jointly in the mounted condition, that is, when the locking devices 15, 16 are in their locked condition, so that a mechanical or electromechanical operating device—here, a geared motor 26—can move the cones 21, 22 synchronously and against the force of the springs 23, 24 in order to thus bring the locking devices 15, 16 into their unlocked condition. The cones 21, 22 are therefore disposed separately, but are operated jointly.

Figure 4:
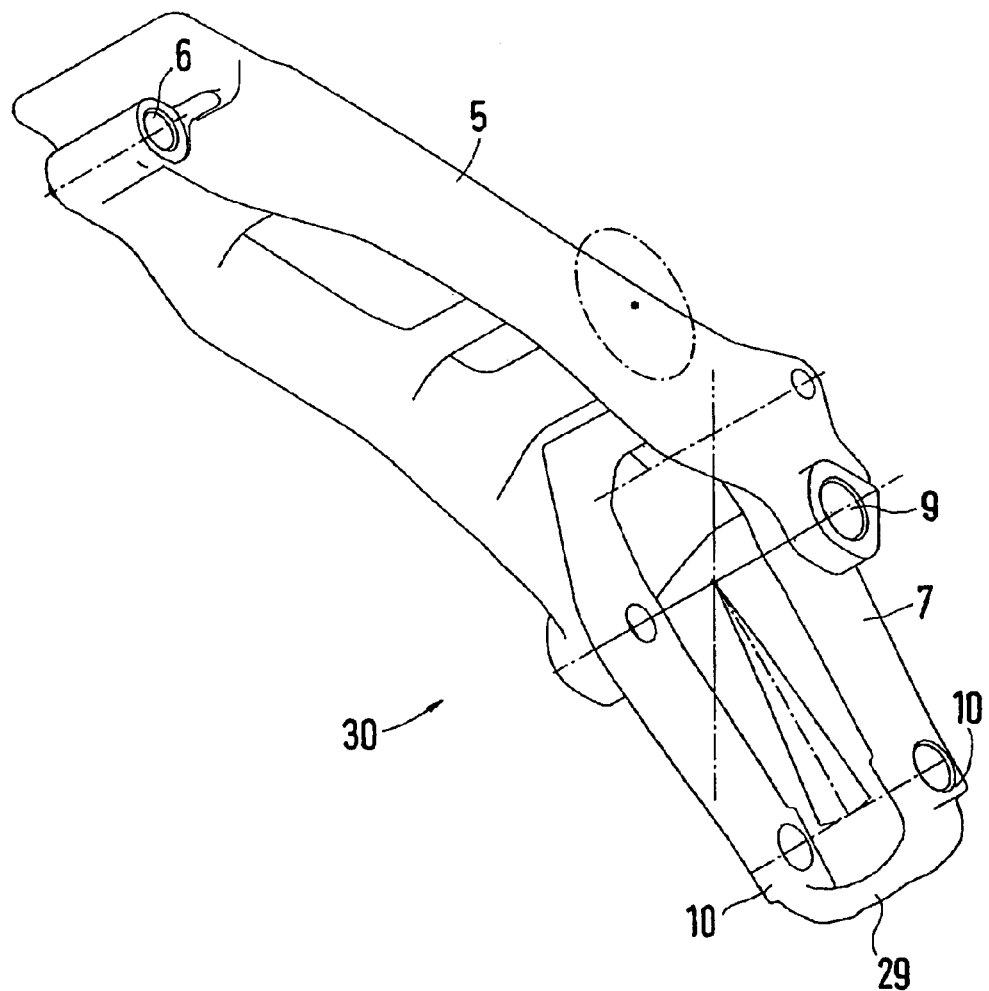
FIG. 4 is a detailed view of a box-type rocker 7 according to FIG. 1.

In the separate view according to FIG. 4, the box-type rocker 7 is illustrated separately. It is easily visible that a lower bow 29 of the box-type rocker 7 closes the box-type rocker still below the sliding piece 11 which is arranged between the lower bearing ends 10 of the box-type rocker 7.

Figure 5:
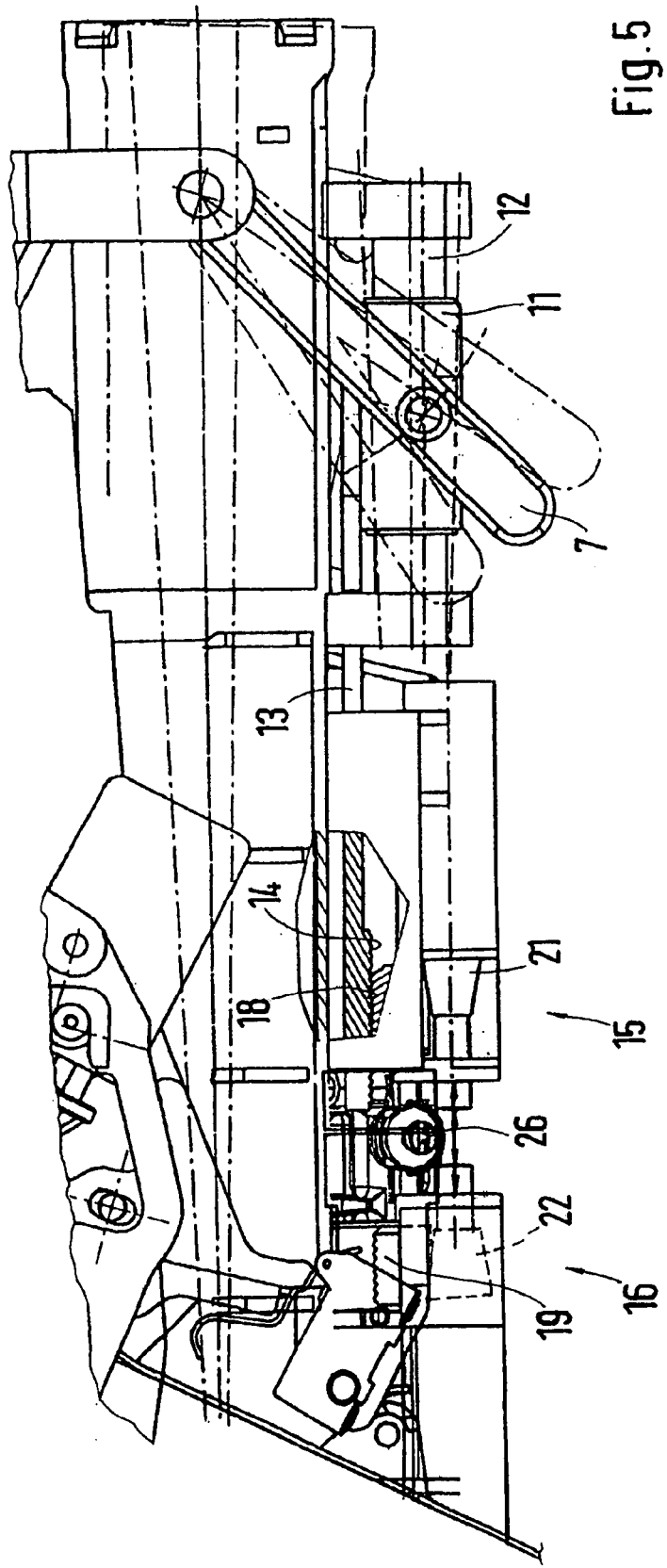
FIG. 5 is a view of an alternative embodiment of the locking devices.
Figure 6:
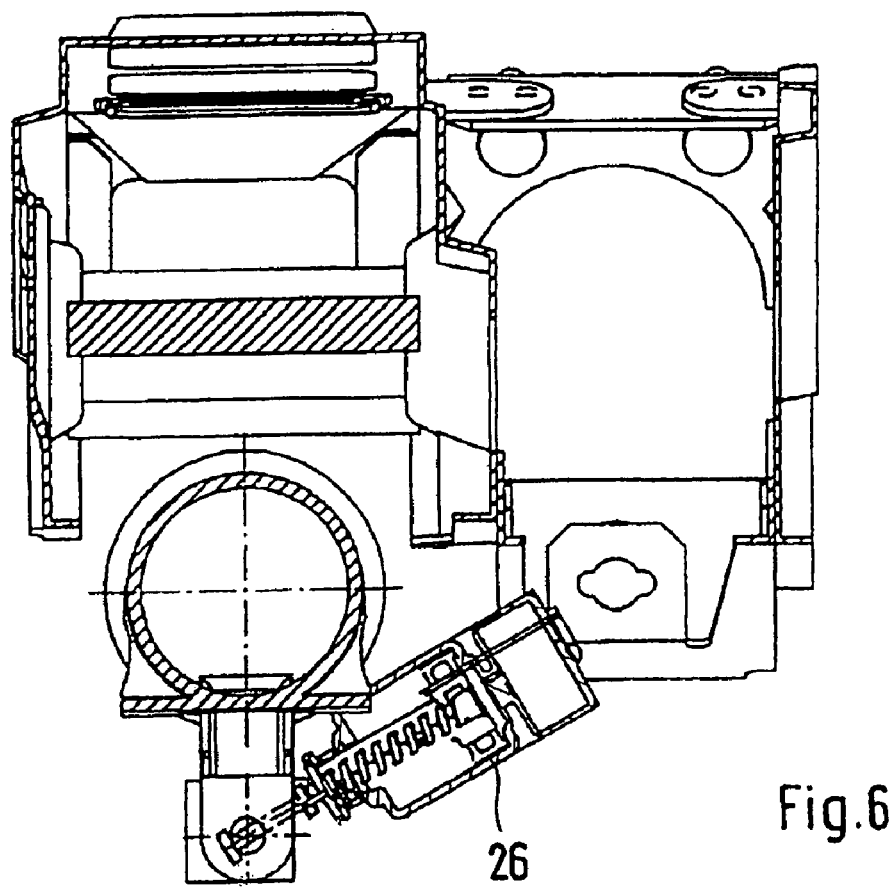
FIG. 6 is a detailed view of an operating device according to FIG. 5.

FIG. 5 shows an alternative arrangement of the locking devices 15, 16. Whereas, according to the above-described embodiment, the locking devices 15, 16 operated in the same direction and were aligned with one another, according to the alternative embodiment according to FIG. 5, the locking devices 15 and 16 are arranged opposite one another. Here, for reasons of space, the operating device 26 is arranged transversely to the operating axis of the locking device 15, 16, as illustrated particularly in FIG. 6. The fact that the box-type rocker 7 is arranged inclined to the driving direction in the illustrated alternative embodiment is only the result of the impeded space conditions of this embodiment.

Figure 3:
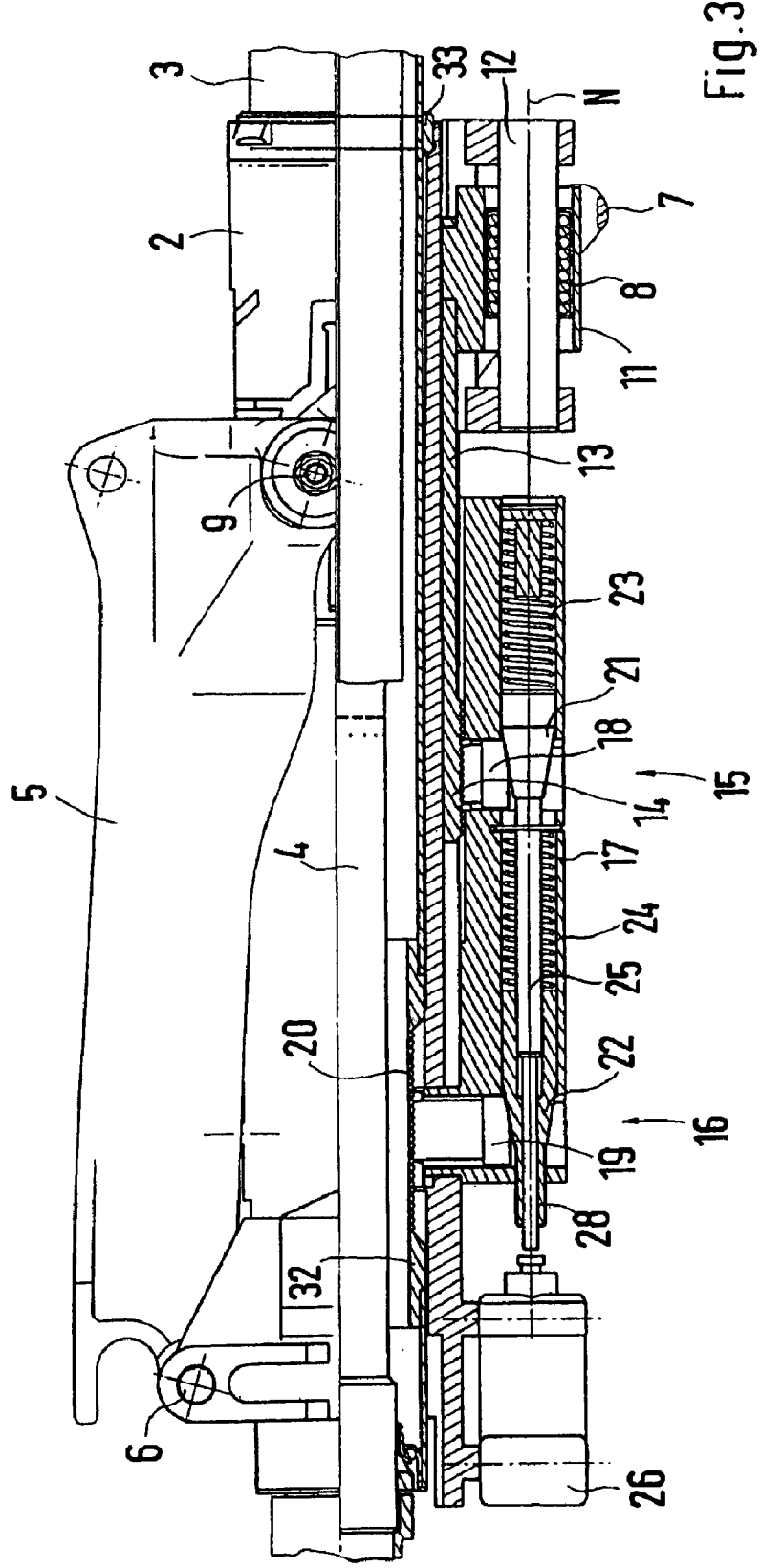
FIG. 3 is a detailed view of locking devices 15, 16 according to FIG. 1.
Figure 7:
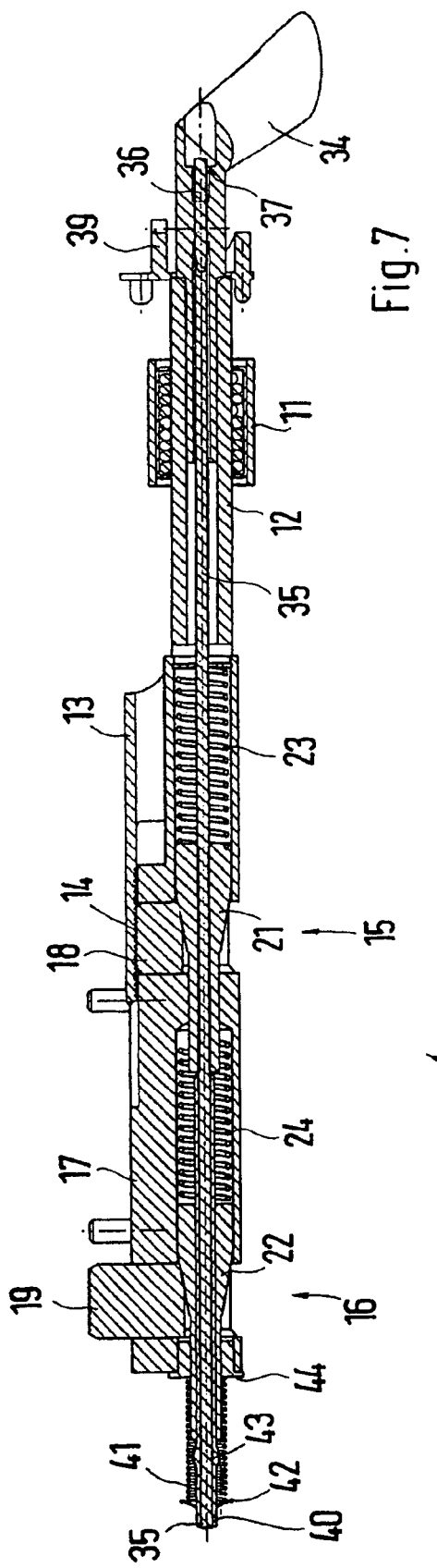
FIG. 7 is a sectional view of another alternative embodiment with a manual operation.

FIG. 7 is another sectional view of an alternative operating device. The illustrated view corresponds to the representation according to FIG. 3; identical elements here also have the same reference numbers. In the alternative illustrated here, the electric-motor-driven operating device 26 (compare FIG. 3) is replaced by a manual operating device 26'. It is easily visible that the housing 17 together with the locking devices 15, 16 forms a separate unit which is mounted on the steering shield tube 2.

Figure 8:
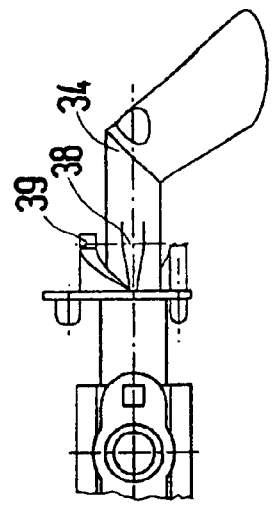
FIG. 8 is a representation rotated by 90° of a handle according to FIG. 7.

The manual operating device 26' consists of a handle 34 and a pull rod 35 which is provided with a nipple 36 at the end side. The nipple 36 is rotatably held in a bore 37 of the handle 34 so that rotating movements of the handle 34 are not transmitted to the pull rod 35. On the handle 34, two projections 38 (see FIG. 8) are molded on laterally which run on a spiral-shaped ramp 39. The handle 34 is simultaneously rotatably guided in the ramp 39. A rotation of the handle 34—in the illustrated embodiment, by maximally 90°—results in a longitudinal displacement of the nipple 36 and thus of the pull rod 35 in the longitudinal direction of the pull rod 35.

In this case, the pull rod 35 penetrates the bolt 12—constructed here in a drilled-hollow fashion—, the cones 21 and 22 as well as the springs 23 and 24. A clamping ring 40 is mounted at the free end of the pull rod 35 and is supported at the housing 17 by way of a spring 41, so that the pull rod 35 and therefore also the handle 34 are always prestressed.

So that the movement of the pull rod 35 is transmitted to the cones 21 and 22, a sleeve 42 is pushed onto the end area of the pull rod 35 and is connected by way of a stamped connection 43 with the pull rod 35. The sleeve 42 is supported—with a preset venting play—on cone 21, while the stamped connection 43—also with a preset venting play—is supported on cone 22. Thus, a movement of the pull rod 35 is transmitted to both cones 21, 22. In this case, the cone 21 is guided in a bearing bush 44.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Adjustable steering column having a first adjusting device for adjusting the steering column in a vertical direction and a first locking device for form-fitting locking of the steering column in the vertical direction, wherein the first adjusting device comprises:
    a vehicle-body-fixed swivel bearing for the steering column and
    a control arm which is swivellably held at a distance from the swivel bearing on the vehicle body, said control arm being disposed at the steering column in a sliding seat.

2. Adjustable steering column according to claim 1, wherein a vehicle-body-fixed console is provided which accommodates the swivel bearing and the control arm.

3. Adjustable steering column according to claim 1, wherein the first locking device for the form-fitting locking of the steering column is applied in a vertical direction to the sliding seat.

4. Adjustable steering column according to claim 2, wherein the first locking device for the form-fitting locking of the steering column is applied in a vertical direction to the sliding seat.

5. Adjustable steering column according to claim 1, wherein a second adjusting device is provided for adjusting the steering column in a longitudinal direction, and a second locking device is provided for locking the steering column in the longitudinal direction.

6. Adjustable steering column according to claim 2, wherein a second adjusting device is provided for adjusting the steering column in a longitudinal direction, and a second locking device is provided for locking the steering column in the longitudinal direction.

7. Adjustable steering column according to claim 3, wherein a second adjusting device is provided for adjusting the steering column in a longitudinal direction, and a second locking device is provided for locking the steering column in the longitudinal direction.

8. Adjustable steering column according to claim 5, wherein the first locking device and the second locking device have a common operating device.

9. Adjustable steering column according to claim 6, wherein the first locking device and the second locking device have a common operating device.

10. Adjustable steering column according to claim 7, wherein the first locking device and the second locking device have a common operating device.

11. Adjustable steering column according to claim 5, wherein at least one of the first and second locking devices comprise a tooth segment and a corresponding pressure piece, and the pressure piece is guided approximately perpendicularly with respect to the tooth segment and is in contact with a spring-loaded cone, the cone being guided approximately perpendicularly with respect to the moving direction of the pressure piece and being movable by an operating device against the spring force.

12. Adjustable steering column according to claim 6, wherein at least one of the first and second locking devices comprise a tooth segment and a corresponding pressure piece, and the pressure piece is guided approximately perpendicularly with respect to the tooth segment and is in contact with a spring-loaded cone, the cone being guided approximately perpendicularly with respect to the moving direction of the pressure piece and being movable by an operating device against the spring force.

13. Adjustable steering column according to claim 7, wherein at least one of the first and second locking devices comprise a tooth segment and a corresponding pressure piece, and the pressure piece is guided approximately perpendicularly with respect to the tooth segment and is in contact with a spring-loaded cone, the cone being guided approximately perpendicularly with respect to the moving direction of the pressure piece and being movable by an operating device against the spring force.

14. Adjustable steering column according to claim 8, wherein at least one of the first and second locking devices comprise a tooth segment and a corresponding pressure piece, and the pressure piece is guided approximately perpendicularly with respect to the tooth segment and is in contact with a spring-loaded cone, the cone being guided approximately perpendicularly with respect to the moving direction of the pressure piece and being movable by an operating device against the spring force.

15. Adjustable steering column according to claim 11, wherein the tooth segment of the first locking device is arranged on an arm which is connected with a sliding piece of the sliding seat movable relative to the steering column.

16. Adjustable steering column according to claim 1, wherein the steering column has a steering shield tube, a jacket tube and a steering shaft, the steering shaft being rotatably held in the jacket tube and the jacket tube being longitudinally displaceably held in a steering shield tube, and the steering shield tube being held in a vehicle-body-fixed console, wherein a first form-fitting locking device is provided for a locking in the vertical direction, a tooth segment being connected with a part of the control arm disposed in the sliding seat, and a pressure piece interacting with the tooth segment being guided on the steering shield tube, and wherein a second form-fitting locking device is provided for a locking in the longitudinal direction, a tooth segment being arranged between the jacket tube and the steering shield tube on the exterior side on the jacket tube, and a pressure piece interacting with the tooth segment being guided on the steering shield tube.

17. Adjustable steering column according to claim 1, wherein a geared motor is provided as an operating device for moving the first locking device between a locking and unlocking position.

18. Adjustable steering column according to claim 5, wherein a gear motor is provided as an operating device for moving the first and second locking devices between locking and unlocking positions.

19. Adjustable steering column according to claim 5, wherein a gear motor is provided as an operating device for moving the first and second locking devices between locking and unlocking positions.

20. Adjustable steering column according to claim 1, wherein a manually operable handle is provided as an operating device, which is rotatably disposed and held on a spiral-shaped ramp, a pull rod connected with the handle penetrating a spring-loaded cone of the first locking device.

21. Adjustable steering column according to claim 5, wherein a manually operable handle is provided as an operating device, which is rotatably disposed and held on a spiral-shaped ramp, a pull rod connected with the handle penetrating spring-loaded cones of the locking devices.

22. A vehicle steering assembly comprising:
a steering column,
a swivel bearing for the steering column, which swivel bearing is fixed to a vehicle body in an in use position,
a sliding seat supporting the steering column at a position spaced from the swivel bearing, and
a control arm pivotally connected with the sliding seat and the vehicle body and operable to accommodate vertical adjustment of the steering column with support of the steering column by the swivel bearing and control arm.

23. A vehicle steering assembly according to claim 22, comprising a locking device operable to lock the steering column in respective vertical adjusted positions.

24. A vehicle steering assembly according to claim 23, wherein said locking device includes a first toothed member carried by the sliding seat and a second toothed member which is selectively movable against the first toothed member.

25. A vehicle steering assembly according to claim 22, comprising means accomodating longitudinal adjustment of the steering column.

26. A vehicle steering assembly according to claim 24, comprising means accomodating longitudinal adjustment of the steering column.

27. A vehicle steering assembly according to claim 26, wherein said means accomodating longitudinal adjustment of the steering column include telescoping parts and selectively interengageable toothed sections.

* * * * *